Patented June 10, 1941

2,245,377

UNITED STATES PATENT OFFICE 2,245,377

PRODUCTION OF CARBONYL COMPOUNDS

Walter Ziese, Mannheim, Germany, assignor, by mesne assignments, to General Aniline & Film Corporation, New York, N. Y., a corporation of Delaware No Drawing. Application March 2, 1939, Serial No. 259,387. In Germany March 1, 1938

4 Claims. (Cl. 260—601)

The present invention relates to a process of making carbonyl compounds of the class consisting of aldehydes and ketones.

More particularly, the invention relates to a practical and economical process for converting, by treatment in aqueous medium with basic magnesium compounds, alkylene halogen hydrins in which the hydroxyl group and the halogen atom are situated on adjacent carbon atoms into carbonyl compounds of the type defined.

It has previously been shown to convert alkylene halogen hydrins by the action of alkali or alkaline earth metal hydroxides into alkylene oxides, and into glycols by treatment with certain metal carbonates. The process of my invention distinguishes from such prior methods in that it uses basic magnesium compounds in aqueous medium, thereby yielding compounds different from those hitherto obtained.

The alkylene halogen hydrins from which I can produce carbonyl compounds are those obtainable for example by the adding on of hypohalous acids to olefinic compounds, in particular olefine hydrocarbons of the aliphatic series containing from 2 to 4 or more carbon atoms. For example ethylene chlorhydrin, 1-chlor-2-hydroxypropane, 2-chlor-1-hydroxypropane, 1-chlor-2-hydroxy-isobutane and the bromhydrins and iodohydrins corresponding thereto are suitable.

It is not necessary in my process to start directly from the alkylene halogen hydrins themselves, but compounds capable of being converted into alkylene halogen hydrins may also be used as starting materials. Mixtures of alkylene oxides and aqueous magnesium halide solutions are suitable in my process. Such mixtures are converted in known manner first into alkylene halogen hydrins and basic magnesium compounds.

Representative basic magnesium compounds of the class which are used in my process are those exerting a basic reaction in aqueous medium, in particular magnesium oxide and magnesium hydroxide, and also magnesium oxychloride. Instead of pure magnesium oxide there may also be used magnesium oxide as obtained by heating magnesite. These compounds may also be allowed to form within the starting mixture itself, if desired, before adding alkylene halogen hydrins. Effective magnesium compounds are formed for example by adding stronger alkaline reacting substances such as calcium oxide or hydroxide, caustic alkali lye or ammonia to solutions of magnesium salts, as for example of magnesium chloride, magnesium sulfate or magnesium nitrate. The salts formed from the stronger basic substances may be left in the reaction mixture during the conversion of the alkylene halogen hydrins, because they do not detrimentally affect the course of this reaction.

The conversion of the alkylene halogen hydrins into carbonyl compounds starts by bringing into contact the basic magnesium compound in an aqueous solution or suspension with the halogen hydrin. The magnesium compound may be added in several portions. The amount of basic magnesium compound should be so selected that the halogen hydride formed is neutralized as fast as formed and that the reaction mixture always has a basic reaction during the conversion. The temperature to be maintained may be room temperature. The conversion proceeds faster by maintaining temperatures between about 50° and 100° C. The reaction may also be carried out at temperatures exceeding 100° C.; in this case the reaction mixture is heated in a closed vessel so that the reaction can substantially proceed in the liquid phase.

For exampe when starting from ethyene chlorhydrin, it is sufficient to heat the starting mixture to such a temperature that the acetaldehyde formed distils off. The procedure may also be by heating under reflux or by keeping the reaction temperature below the boiling point of the aldehyde formed down to room temperature. The reaction then proceeds with the formation of high molecular weight carbonyl compounds which are partly aldehydes and partly ketones and the composition of which could not hitherto be ascertained in all cases.

When starting from ethylene chlorhydrin and heating the reaction mixture to from about 85° to 90° C., the acetaldehyde formed distils off almost completely. If the reaction temperature is kept below 80° C., however, and heating is continued for a long time, mainly condensation products of acetaldehyde, as for example aldol, and from this crotonaldehyde, are formed. In the corresponding manner, propionaldehyde or its condensation products are obtained from 1-hydroxy-2-chlorpropane. When using 1-chlor-2-hydroxypropane, the acetone which would be expected is not obtained but higher unsaturated carbonyl compounds are formed.

The process according to my invention allows not only of obtaining hitherto known aldehydes and ketones in a very simple manner, but also of preparing valuable higher molecular carbonyl compounds not hitherto accessible which by reason of the carbonyl groups contained therein are capable of a great variety of chemical reactions. It is also possible to carry out such further chemical reactions by adding to the starting mixture of alkylene chlorhydrin and magnesium compound substances which are liable to react with the carbonyl compounds formed, for example other aldehydes which form condensation products with the carbonyl compounds.

The following examples will further illustrate how my invention may be carried out in practice but the invention is not restricted to these examples.

Example 1

A mixture of 1.5 kilograms of aqueous ethylene chlorhydrin solution containing 240 grams of ethylene chlorhydrin with 120 grams of finely pulverized magnesium oxide is heated while stirring to 80° C. in a vessel provided with a descending condenser. When the said temperature is attained, the source of heat is removed. The reaction mixture then heats spontaneously to about 87° C., a vigorous development of acetaldehyde ensuing which distils off in admixture with water and which is collected in an ice-cooled receiver. As soon as the reaction becomes weaker, it is heated again so that the mixture again boils vigorously. When the current of vapor passing over has attained a temperature of 100° C., the whole of the acetaldehyde formed has been removed from the reaction mixture. It may be recovered from the aqueous distillate in known manner and purified by way of its compound with ammonia. The amount of acetaldehyde in the aqueous solution amounts to 112 grams; this corresponds to a yield of about 85 per cent of the calculated amount.

Example 2

15 kilograms of an aqueous propylene chlorhydrin solution containing 2.7 kilograms of propylene chlorhydrin (mainly 1-chlor-2-hydroxypropane with some 1-hydroxy-2-chlorpropane) are mixed with 1.2 kilograms of pulverized magnesium oxide and the mixture stirred for 12 hours at room temperature. The whole is then heated for 4 hours at 40° C. and for further 12 hours at 70° C. The constituents volatile up to 100° C. are then distilled off in admixture with water. In the resulting distillate, two layers are formed of which the lower consists mainly of water and the upper of about 650 cubic centimeters of a carbonyl compound containing small amounts of propylene oxide, propionaldehyde and propylene chlorhydrin. The lower layer is separated and distilled. The fraction passing over above 120° C., mainly between 130° and 135° C., is collected, freed from compounds containing chlorine by shaking with 25 per cent aqueous caustic potash solution, dried with potassium carbonate and distilled under reduced pressure. About 300 grams of a pale yellow-green colored carbonyl compound are thus obtained which yields a semicarbazone melting at about 198° C.

Example 3

700 cubic centimeters of an aqueous ethylene bromhydrin solution containing 170 grams of ethylene bromhydrin are stirred with 60 grams of magnesium oxide for 12 hours at 20° C. and the temperature is then raised in the course of about 5 hours to 50° C. while further stirring and kept at the said temperature, until the reaction is completed. This may be established by acidifying 1 cubic centimeter of the reaction mixture with dilute nitric acid and titrating the bromine ions formed with one tenth normal silver nitrate solution by the method of Volhard. The reaction is completed when the consumption of silver nitrate is about 20 cubic centimeters.

By distilling the reaction mixture there are obtained about 200 cubic centimeters of a liquid which is then saturated with potassium carbonate. Two layers are formed of which the upper is removed, dried and again distilled. Crotonaldehyde is thus obtained in a yield of about 40 grams.

What I claim is:

1. The method of producing aldehyde and ketones which comprises contacting in aqueous medium alkylene halogen hydrins selected from the group consisting of alkylene chlor- and bromhydrins wherein the halogen atom and the hydroxy group are in alpha-position to each other, with magnesium compounds exerting a basic reaction in aqueous medium, and distilling off the carbonyl compounds formed.

2. The method of producing aldehydes and ketones which comprises contacting in aqueous medium alkylene halogen hydrins selected from the group consisting of alkylene chlor- and bromhydrins where the halogen atom and the hydroxy group are in alpha-position to each other, with magnesium oxide, and distilling off the carbonyl compounds formed.

3. The method of producing aldehydes and ketones which comprises contacting in aqueous medium ethylene chlorhydrin with magnesium oxide and distilling off acetaldehyde substantially as fast as formed.

4. The method of producing aldehydes and ketones which comprises heating an aqueous solution of propylene chlorhydrin with such an amount of magnesium oxide that the solution has a basic reaction and distilling off the carbonyl compounds formed.

WALTER ZIESE.